United States Patent
Chen et al.

(10) Patent No.: US 9,062,961 B2
(45) Date of Patent: Jun. 23, 2015

(54) SYSTEMS AND METHODS FOR CALCULATING BALLISTIC SOLUTIONS

(71) Applicant: Laxco Inc., Bothell, WA (US)

(72) Inventors: Congliang Chen, Bothell, WA (US); Wenzhong Wu, Bothell, WA (US); Andrew Parsons, Bothell, WA (US)

( * ) Notice: Subject to any disclaimer, the term of this patent is extended or adjusted under 35 U.S.C. 154(b) by 84 days.

(21) Appl. No.: 13/769,712

(22) Filed: Feb. 18, 2013

(65) Prior Publication Data

US 2015/0106046 A1  Apr. 16, 2015

(51) Int. Cl.
*F41G 1/38* (2006.01)
*G06G 7/80* (2006.01)
*G01B 11/00* (2006.01)

(52) U.S. Cl.
CPC . *G01B 11/00* (2013.01); *F41G 1/38* (2013.01)

(58) Field of Classification Search
CPC .................................. G06G 7/80; G01B 11/00
USPC .............................. 235/404, 407, 414; 42/122
See application file for complete search history.

(56) References Cited

U.S. PATENT DOCUMENTS

| | | | |
|---|---|---|---|
| 4,969,735 A | 11/1990 | Gilligan | |
| 5,375,072 A | 12/1994 | Cohen | |
| 6,032,374 A | 3/2000 | Sammut | |
| 6,508,026 B1 | 1/2003 | Uppiano et al. | |
| 7,516,571 B2 | 4/2009 | Scrogin et al. | |
| 7,603,804 B2 | 10/2009 | Zaderey et al. | |
| 8,172,139 B1 | 5/2012 | McDonald et al. | |
| 8,281,995 B2 | 10/2012 | Bay | |
| 8,336,776 B2 | 12/2012 | Horvath et al. | |
| 2011/0168777 A1 | 7/2011 | Bay | |

*Primary Examiner* — Daniel Hess (57) ABSTRACT

Systems and methods to calculate ballistic solutions for use with a projectile launching device are disclosed herein. In some embodiments, the system includes a telescopic sight assembly for viewing a target, wherein the telescopic sight assembly comprises at least one display device for displaying information, a processor, a memory, and a data input device, wherein the system for use with a projectile launching device to calculate ballistic solutions is configured to perform passive target ranging. In some embodiments, the system includes a telescopic sight assembly for viewing a target, at least one display device for displaying information to a user within the field-of-view of the telescopic sight assembly, a processor configured to receive user input data associated with one or more actual projectile impact locations as observed by the user, a memory, and a data input device, wherein at least one display device displays a calculated projectile impact location.

14 Claims, 9 Drawing Sheets

SYSTEMS AND METHODS FOR CALCULATING BALLISTIC SOLUTIONS

FIELD OF THE DISCLOSURE

The present disclosure relates generally to the aiming of projectile launching devices and, more particularly, to systems and methods to calculate ballistic solutions for use with projectile launching devices such as, for example, rifles.

BACKGROUND

This section provides background information related to the present disclosure which is not necessarily prior art.

Telescopic sight assemblies, commonly referred to by those skilled in the art as scopes, are commonly used with projectile launching devices, e.g. firearms, to facilitate efficient and accurate aiming of the projectile launching device. Typical telescopic sight assemblies allow a user to more clearly see an intended target by magnifying the target and collecting light to brighten the target's appearance. Moreover, typical telescopic sight assemblies include a reticle, i.e. a network of fine lines or markings that can be seen by a user when looking through the telescopic sight assembly, to assist a user is accurately predicting a projectile impact location upon an intended target. A reticle typically comprises a static image viewable within the field-of-view of the telescopic sight assembly. The two main types of reticle are etched glass reticles and wire reticles. While the fine crosshair is probably the most commonly used reticle image, many other reticle images are known and used by those skilled in the art. Some reticle images are designed to assist a user, e.g. a rifle shooter, in accurately engaging a target by providing features to assist the user in: accurately determining a distance (also referred to as "range") to the target; estimating and compensating for the amount of projectile drop which occurs over certain distances; and to estimate and compensate for the windage due to cross-winds.

Although conventional reticles do provide features to assist a user in accurately engaging a target, the reticle images are static, e.g. they do not adjust within the field-of-view of the telescopic sight. Therefore, in many situations a user is required to "hold off" a part of the reticle image, e.g. a crosshair, from the desired projectile impact location in estimation that the projectile will actually engage the desired impact location. With current forms of technology, however, a reticle image can be generated by a computer and superimposed within the field-of-view of the telescopic sight assembly such that a calculated projectile impact location appears precisely at that location on the target within the field-of-view allowing the user to align the calculated projectile impact location with the desired projectile impact location. That is, the calculated projectile impact location may be displayed within the field of view, e.g. as a cross-hair, not at a static location but rather it may appear dynamically within the field-of-view.

For example, U.S. Pat. No. 8,336,776 B2 to Horvath et al., dated Dec. 25, 2012, and fully incorporated by reference herein, discloses an aiming system for use with a weapon which may include a display in communication with a processor that displays a corrected aiming point.

Calculating a projectile impact location requires the consideration of many factors including but not limited to: projectile muzzle velocity; ballistic coefficient of the projectile; height of the telescopic sight assembly over the axis of the bore of the projectile launching device; cross-wind velocity; and distance to the target. Generally, there are three methods used in the art to determine the distance to the target: (1) the process of "milling" a target; (2) using an infrared/laser range finding device; (3) adjusting a distance setting via a bezel on a telescopic sight assembly. The first two of these methods are described in detail in U.S. Pat. No. 8,281,995 B2 to Bay, dated Oct. 9, 2012, and fully incorporated by reference herein, which discloses a system for improving the accuracy of target "milling" and also for calculating ballistic solutions, some of which incorporate Data Observed from Previous Engagements to increase the accuracy of the calculated ballistic solutions. The third method is described in detail in U.S. Pat. No. 6,508,026 B1 to Uppiano et al., dated Jan. 21, 2003, and fully incorporated by reference herein, which discloses a rifle scope with side indicia with a distance setting bezel configured so that a non-aiming eye of the user can view the distance setting while the scope is in the aimed position.

The process of milling a target can be cumbersome and can also provide inaccurate results if the user inaccurately estimates the height of the object used for milling or if the user inaccurately measures the angle during the milling process. Additionally, the use of infrared laser ranging devices may compromise the position of a user which is obviously undesirable in combat situations. Moreover, even if the user relies on the distance setting of the scope to determine the range of the target, the user will still be required to "hold off" the reticle from the desired impact location which exacerbates the problem of user error. Therefore, there is a need for systems and methods of estimating the distance to the target without risking compromising the user's position and for calculating a projectile impact location based on the estimated distance to the target.

An additional problem with current sight assemblies is that gathering Data Observed from Previous Engagements can require a user to approach a target to collect the data or to estimate the data from afar. Thus, there is an additional need for systems and methods of collecting Data Observed from Previous Engagements quickly and accurately from the location from which a projectile was launched.

SUMMARY

This section provides a general summary of the disclosure, and it is not a comprehensive disclosure of its full scope or all of its features.

Systems and methods to calculate ballistic solutions for use with a projectile launching device are disclosed herein. In some embodiments, the system includes a telescopic sight assembly for viewing a target, wherein the telescopic sight assembly comprises at least one display device for displaying information, a processor in communication with at least one sensor, a memory, and a data input device, wherein the system for use with a projectile launching device to calculate ballistic solutions is configured to perform passive target ranging. In some embodiments, the system includes a telescopic sight assembly for viewing a target, at least one display device for displaying information to a user within the field-of-view of the telescopic sight assembly, a processor configured to receive user input data associated with one or more actual projectile impact locations as observed by the user, a memory, and a data input device, wherein at least one display device displays a calculated projectile impact location.

The following embodiments and descriptions are for illustrative purposes only and are not intended to limit the scope of the systems and methods for calculating ballistic solutions.

Other aspects and advantages of the present invention will become apparent from the following detailed description.

BRIEF DESCRIPTION OF THE DRAWINGS

These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Example embodiments will be described more fully in this section with reference to the provided figures. Example embodiments are provided to fully convey the scope of this disclosure to those skilled in the art. The present systems and methods for calculating ballistic solutions may have additional embodiments, may be practiced without one or more of the details described for any particular described embodiment, or may have any detail described for one particular embodiment practiced with any other detail described for another embodiment. Numerous specific details are set forth as examples of specific components, devices, and methods that may be utilized and are intended to provide a thorough understanding of embodiments of the present disclosure. It will apparent to one skilled in the art that these specific details need not be employed, that example embodiments may be embodied in many different forms, and that neither should be construed to limit the scope of the disclosure. In some example embodiments, well-known processes, well-known device structures, and well-known technologies are not described in detail. Moreover, the method steps, processes, and operations described herein are not to be construed as necessarily requiring their performance in any particular order discussed or illustrated, unless specifically identified as an order of performance. It is also to be understood that additional or alternative steps may be employed.

Referring now to the drawings, FIGS. 1-5 show a preferred embodiment of the system 10 to calculate ballistic solutions for use with projectile launching devices. The system 10 includes a telescopic sight assembly 12 for viewing a target, a display device 14 (see FIG. 4) for displaying information to a user within the field-of-view of the telescopic sight assembly 12, a processor 16 configured to receive user input data, a memory 18; and a data input device 20. In some embodiments, the system 10 is configured perform passive target ranging. In some embodiments, the processor 16 of system 10 is configured to receive user input data associated with one or more actual projectile impact locations as observed by the user and use the data to calibrate, e.g. by modifying one or more ballistic equations or factors used within the equations, a calculated projectile impact location and display the calculated impact location within the field of view of the Telescopic Sight Assembly 12.

In a preferred embodiment, the telescopic sight assembly 12 encloses a plurality of lenses, including an ocular lens 22 and an objective lens 24, within a housing 26. The combination of the plurality of lenses makes up an optics train 28. The objective lens 24 is directed at the desired target so as to be sighted and appear within the field-of-view 30 of the telescopic sight assembly 12. A user (not shown) places his eye adjacent to the ocular lens 24 to sight through the telescopic sight assembly 12 and, more particularly, the optics train 28. The optics train 28 provides an image of a target viewable to a user looking through the ocular lens 22. Opposite the ocular lens 22 where light exits the system 10 for a user to view a target, an objective lens 24 gathers light which then passes through the optics train 28. As light passes through the objective lens 24, the image is reversed such that it is upside down and, therefore, it must be sent through an internal picture reversal assembly 42 which returns the image to the right-side-up position. Generally, the ocular assembly 28 then makes the final enlargement of the image.

The system 10 may include mounting hardware (not shown) that connects the system 10 to a projectile launching device (not shown) such as, for example, a rifle. Preferably, the mounting hardware incudes a mechanism to allow for the user to adjust the orientation of the system 10 relative to the projectile launching device. In the illustrated embodiment, the system 10 can be attached via a rail 32 to a projectile launching device, e.g. a firearm and preferably a rifle (not shown). While an adjustment mechanism (not shown) may be used to adjust the system, for reasons that will become apparent to one skilled in the art based on this disclosure such a mechanism is not necessary.

In the illustrated embodiment, which is a preferred embodiment, the optics train 28 provides variable magnification of the target thus allowing a user to adjust the magnification, and therefore viewable size, of a target as desired. Also preferably, the objective lens 24 is sized to gather sufficient light such that a target is viewable even in dawn and dusk conditions as is required in many hunting situations as animals become more active during these hours. For example, a preferred embodiment may comprise variable magnification power allowing the target to be magnified to a size of four to sixteen times the true viewable size of the target (i.e. 4×-16× magnification) and also comprise an objective lens 24 of approximately 44 millimeters in diameter.

In some embodiments, the magnification power is adjusted by rotating the power selector ring 34 until the desired magnification is reached. When the power selector ring 34 is rotated, one or more of the plurality of lenses of the optics train 28 is adjusted such that the overall configuration of the lenses changes thereby adjusting the magnification of the target image viewed through the telescopic sight assembly 12. Preferably, the power selector ring 34 and the housing 26 comprise markings 36 to indicate various magnification power settings. Because the design of power adjustment mechanisms for telescopic sight assemblies is well known in the art, specific details of such designs needn't be discussed at length. In some embodiments, the system 10 includes one or more sensors configured to detect the current magnification power of the system 10. For example, the system 10 may comprise a linear position sensor (not shown) configured to detect the location of one or more lenses within the optics train 28 and communicate the location of the lense(s) to the processor 16. In some embodiments, this information is displayed to the user within the field-of-view 30.

In some embodiments, the system 10 includes one or both of a windage adjustment knob 38 and an elevation adjustment knob (not shown). In the illustrated embodiment, the windage adjustment knob 38 is located toward the front of the housing 26, i.e. the side of the housing 26 where the objective lens 24 is located. In some embodiments, rotation of either the windage adjustment knob 38, or an elevation knob (not shown), causes the internal components, and more specifically one or more of the lenses, to rotate such that the field-of-view 30 may be centered on an actual projectile impact location associated with predetermined environmental conditions. For example, a user may "zero" a rifle being used with the system 10 such that a bullet will impact with a target at the center of the field-of-view 30 of the system 10. This type of adjustment is very well known in the art as a typical rifle scope has a stationary reticle, e.g. a cross-hair, in the center of the field-of-view of the scope. Thus, in some embodiments of the current system 10 a user may mechanically adjust the telescopic sight assembly 12 as it would in a typical scope. Preferably, in these embodiments, once the telescopic sight assembly 12 is "zeroed" the reticle 40 will coincide with the calculated projectile impact location which will coincide with the center of the field-of-view 30 based on predetermined zeroing conditions such as, for example, negligible crosswind and a target range of 200 yards. In some embodiments, rotation of the windage adjustment knob 38 causes information to be communicated to the processor 16 regarding current environmental wind conditions. For example, referring specifically to FIG. 2 certain displayed information 44 is displayed within the field-of-view 30 on the display device 14. In certain embodiments where a user causes information to be communicated to the processor 16 by rotating the windage adjustment knob 38 the display 16 instantaneously updates the information to allow a user to stop rotation when the desired current environmental wind conditions are represented on the display device 14. The user may obtain this information by using an external device, e.g. a handheld wind-meter and then manually enter the information via rotating the windage adjustment knob 38. In other embodiments, the system 10 is configured to communicate directly with a wind sensing device (not shown).

In some embodiments, the windage adjustment knob 38 is coupled to an angular encoder (not shown) such that when a user rotates the windage adjustment knob 38 the angular encoder communicates an adjusted wind speed to the processor 16 to be simultaneously displayed to the user and also to be used to calculate a projectile impact location. In a preferred embodiment, the a full 360 degree rotation is divided in half to represent left and right cross-winds such that when a user rotates the windage adjustment knob 38 clockwise 180 degrees the processor 16 interprets the rotation as a 60 mile per hour (mph) left-to-right cross-wind, and when a user rotates the windage adjustment knob 38 counter-clockwise 180 degrees the processor 16 interprets the rotation as a 60 mph right-to-left cross-wind. In some embodiments, the angular velocity at which a user rotates the windage adjustment bezel 38 has an impact on the rate at which the processor 16 adjusts the entered wind speed.

Figure 1:
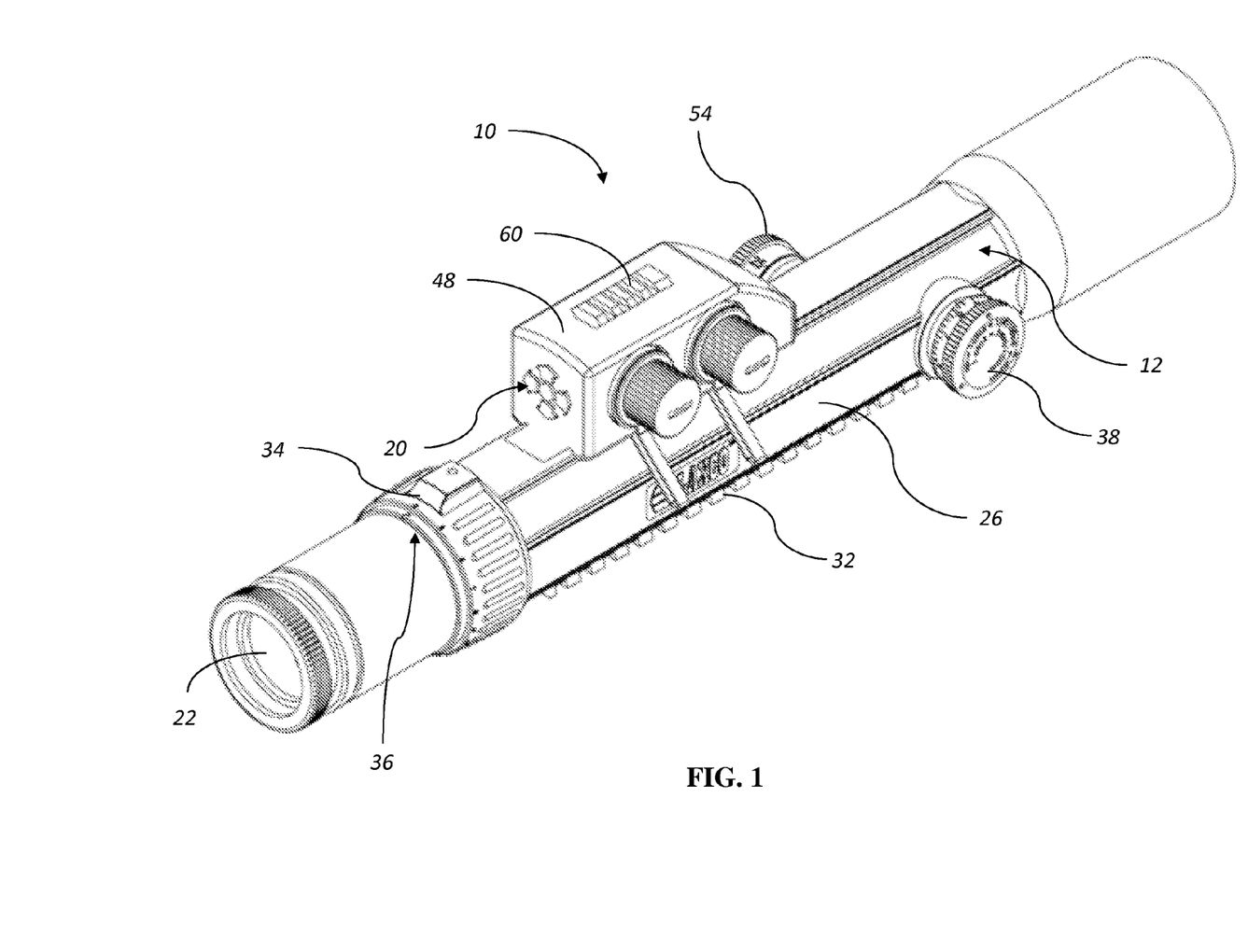
FIG. 1 is a perspective view of a system to calculate ballistic solutions for use with projectile launching devices in accordance with an embodiment of the present disclosure.
Figure 2:
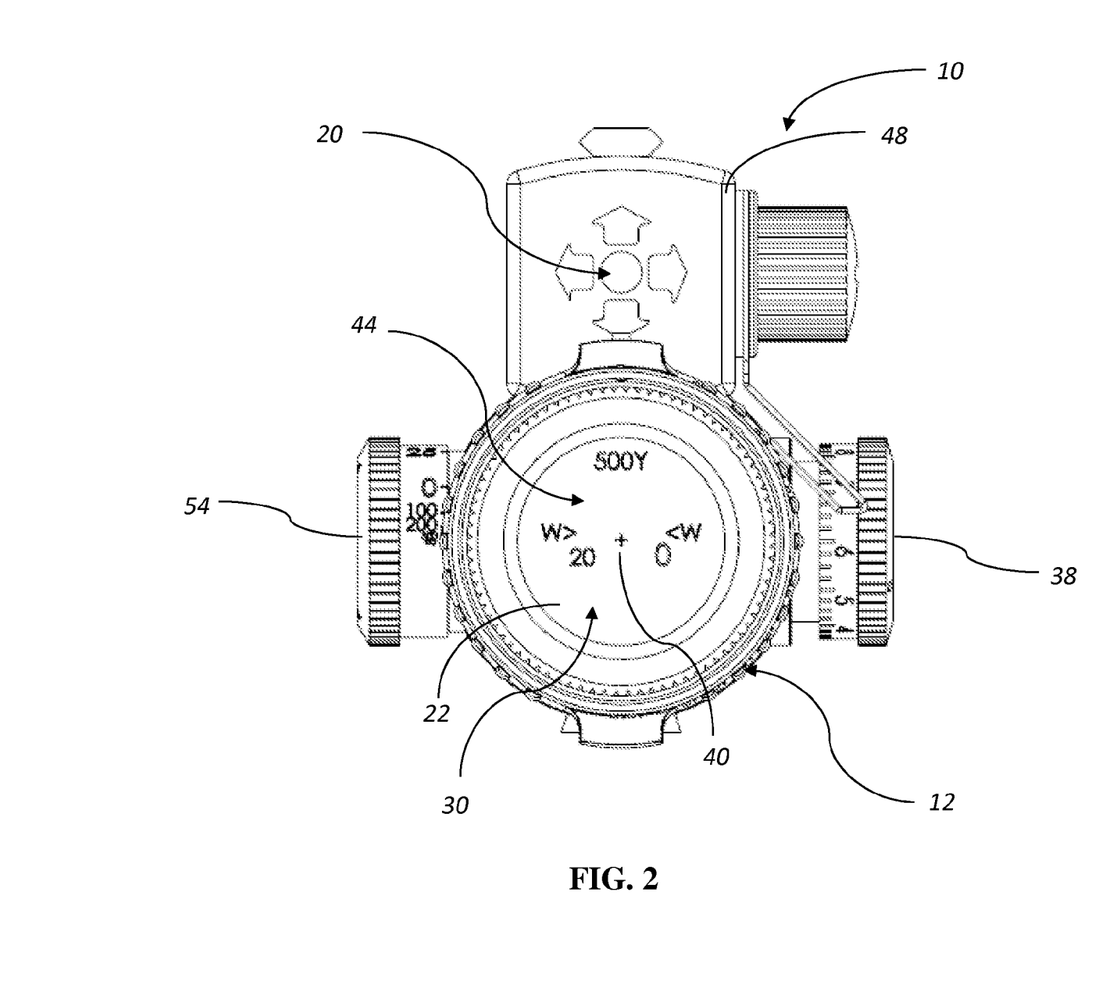
FIG. 2 is a front view of the system of FIG. 1 showing a view through an ocular lens in accordance with an embodiment of the present disclosure.

With particular reference to FIG. 2, a front view of the system of FIG. 1 showing a view through the system 10 from the ocular lens 22 is provided. In the illustrated embodiment, certain displayed information 44 is being displayed by the display device 14 within the field-of-view 30 of the telescopic sight assembly 12. In some embodiments, the display device 14 is disposed adjacent to an ocular assembly 46 (see FIG. 4). While it is within the scope of the present disclosure for a non-transparent display to be used, it is preferable that the display is transparent such that light is able to pass through the display device 14. Suitable display devices for presenting information include any one of a liquid-crystal display (LCD), a transparent LCD, a light-emitting diode (LED) display, an organic light-emitting diode (OLED) display, electrophoretic ink (E ink), or any other suitable for displaying an image for the user of the system 10. As with all examples provided herein, these embodiments and descriptions are for illustrative purposes only and are not intended to limit the scope of the present disclosure.

Still referring to FIG. 2, in the illustrated embodiment the displayed information 44 includes the distance to the target, also referred to as target range, which is shown as "500Y" representing a distance of 500 yards to the target. For clarity and simplicity of the provided illustrations, an actual target is not depicted; however, the target could comprise any target including but not limited to a paper target, a game animal, or a person. As can further be seen, the information also includes the current wind conditions, which is shown as "W>20 0$^{<W>}$" representing a left-to-right cross wind of 20 units of measurement. The units of measurement can be changed as desired by the user, e.g. the outputted units of measurement may be set to miles per hour (mph), meters per second (m/s), or any other measurement desired by the user. The information displayed in the illustrated embodiment further comprises a reticle 40 within the field-of-view of the telescopic sight assembly wherein the reticle 40 indicates a calculated projectile impact location on the target (not shown). The calculated projectile impact location is calculated by the processor 16 through the use of various well known ballistic equations and various variables such as ballistic coefficients, muzzle velocity, range, height of the sight above bore axis, cross-wind velocity and direction, and angle of the scope (and therefore bore axis) relative to the horizon. As ballistics, and more particularly external ballistics, are well understood by those in the art specific equations need not be discussed.

In some embodiments, a battery housing 48 is configured to receive and hold replaceable batteries 50 for powering the system electronics. Such an embodiment is preferable because the batteries 50 can be easily replaced in the event the charge is lost, a characteristic that is helpful in the event that the batteries 50 lose their charge while away from a conventional power grid. It has been found that 3.6 volt 900 mAh Litium Ion batteries are a suitable choice for optimizing battery life against weight and packaging design constraints. Moreover, in a preferred embodiment the system 10 automatically enters either a power savings mode where limited activity takes place within the system or the system automatically powers down in the event that the system 10 senses, through a gyroscope for example, that the angle of the system reaches a predetermined threshold that would indicate the user is not actively using the system 10. For example, if in a certain configuration the projectile launching device is a high powered rifle it would be expected that when a user began walking to a new location the weapon would be slung over the user's shoulder. Therefore, the gyroscope would sense that the angle of the system axis, e.g. as defined by the telescopic sight assembly 12, exceeded a predetermined angle above the horizon and the processor would cause the system to power down. Moreover, in some embodiments the system 10 includes a solar panel or photovoltaic module to continually charge the system 10 when exposed to light.

Still referring to FIG. 2, in the illustrated embodiment the data input device 20 is located above the housing 26 of the telescopic sight assembly 12 such that it is viewable by a user situated behind the system 10. It is preferable for the data input device 20 to be situated this way for it facilitates ready access to enter user input from a comfortable position as the system 10 is in use. In some embodiments, the data input device 20 includes a plurality of push-buttons as the user interface elements. As is seen in FIG. 2, the illustrated embodiment comprises five push-buttons arranged in a pattern of four directional arrows and a single center push-button. This is the preferred arrangement for reasons that will become apparent to one skilled in the art later in this application when the system calibration is described in further detail.

Figure 3:
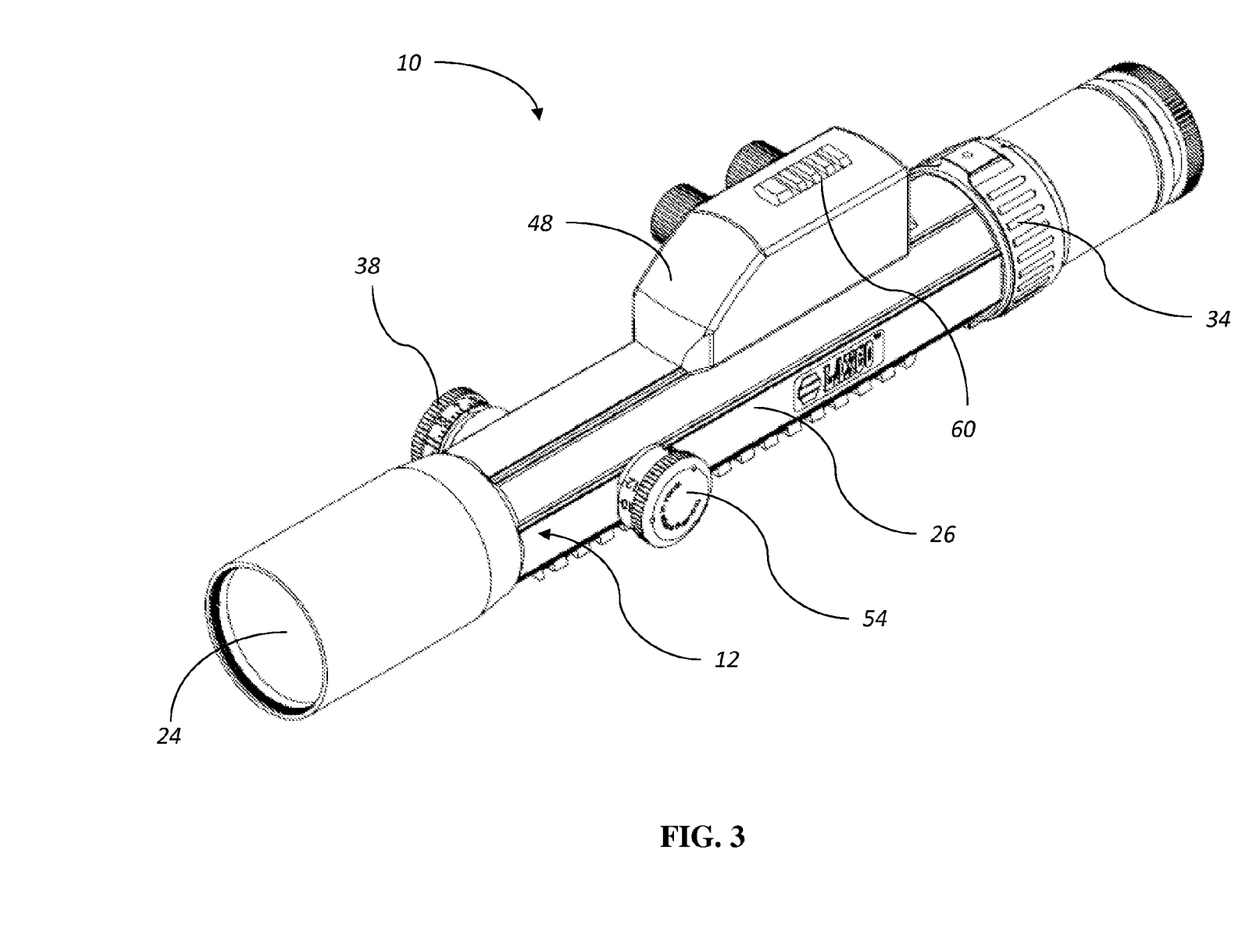
FIG. 3 is a perspective view of the system of FIG. 1 in accordance with an embodiment of the present disclosure.

With particular reference to FIG. 3, in the illustrated embodiment the system 10 comprises a distance adjustment bezel 54 wherein the adjustment of the distance adjustment bezel 54 alters the internal arrangement or configuration of one or more lenses so as to adjust the focal point relative to the target being viewed. In the illustrated embodiment, the distance adjustment bezel 54 is of tubular construction and comprises an exterior surface designed for ease of grabbing by a user, e.g. a knurled surface, thus facilitating ease of fine manipulation by the user. Similar to many distance adjustment bezels on typical telescopic sights, the distance adjustment bezel may comprise external indicia corresponding to the distance settings of the scope. For example, if the distance setting of the telescopic sight assembly 12 is such that an object at a distance of 200 yards away is in focus the external indicia, via alignment of various markings, indicates to the user that the scope is at this setting. Thus, once the user has brought a target into focus by adjusting the distance adjustment bezel 54 the external indicia would visually indicate to the user the actual distance to the target.

In a preferred embodiment, the system 10 comprises a sensor 56 configured to detect the internal arrangement or configuration of one or more lenses. More specifically, the system 10 may be configured to calculate a distance to a target which is in focus based on at least one measured relative position between one or more components of the telescopic sight assembly 12. For example, as described in the previous paragraph and in U.S. Pat. No. 6,508,026 B1 in some telescopic sights allow the user to view a distance setting once a target has been brought into focus where this distance is based on known optical properties of the telescopic sight. However, because the internal components will require less adjustment, in terms of linear travel, to adjust the focus from a distance of 500 yards to a distance of 600 yards than the same sight will require to adjust the focus from a distance of 200 yards to 300 yards, the marks representing different distances on the distance adjustment bezel 54 naturally must be spaced closer together as the indicated distance increases. Accordingly, as the distance to the target increases it becomes more difficult for the user estimate the distance to the target, especially when the external indicia do not align perfectly. In a preferred embodiment, the sensor 56 is a linear position sensor configured to detect the linear position of one or more lenses with relation to one or more other lenses within the optics train 28. Modern sensor technology allows for highly accurate readings of linear position to be taken with sensors as small as 4 mm×2.5 mm and such miniature sensing technology is ideal for the current application. In a preferred embodiment, a high resolution non-contact position sensor is used, e.g. a magnetic array sensor with an integrated on-chip digital encoder for transforming a magnetic sine wave into a direct digital position output. An example of a sensor that may be used in a preferred embodiment is currently sold by New Scale Technologies, Inc., (www.newscaletech.com) and is named the NSE-5310 miniature position sensor.

The state of infinity focus in optics is the state at which the internal lenses are configured to focus an image of an object at in infinite distance away which corresponds to the state at which parallel light rays inter the system to form an image at a focal point of the lens or system of lenses. As the object, and in this case the target, is placed at a greater distance away the internal system alteration required to focus the system will become so slight that it becomes impracticable to accurately estimate the distance to the object based on of the measured optical properties of the system. With regard to the system 10 disclosed herein, it has been found that accurate estimations of target distance can be attained for distances up to 1000 yards with the accuracy of the readings increasing as the distance to the object decreases. For most purposes, the systems 10 capabilities suffice for calculating highly accurate ballistic solutions.

It will be appreciated by one skilled in the art that the system 10 disclosed herein is configured to determine a distance to the target, represented by a focal plane of the system 10 once the target has been brought into sharp focus, based on one or more optical properties of the system 10 wherein at least one optical property determined based on an input from the sensor 56 configured to detect the internal arrangement or configuration of one or more lenses. As used herein, the term optical property is not limited to the behavior of light between individual materials. Rather, it may refer to one or more optical properties of the system 10 as a whole or the telescopic sights assembly and may include properties such as focal length, eye relief, and so on. Moreover, measuring an optical property is not intended to be limited to directly measuring an optical property; therefore, it should be appreciated that for purposes of the system and method for calculating ballistic solutions disclosed herein measuring the position between one or more system 10 components and subsequently calculating an optical property is within the intended meaning of measuring an optical property and, in fact, this is the preferred way of determining optical properties.

Figure 4:
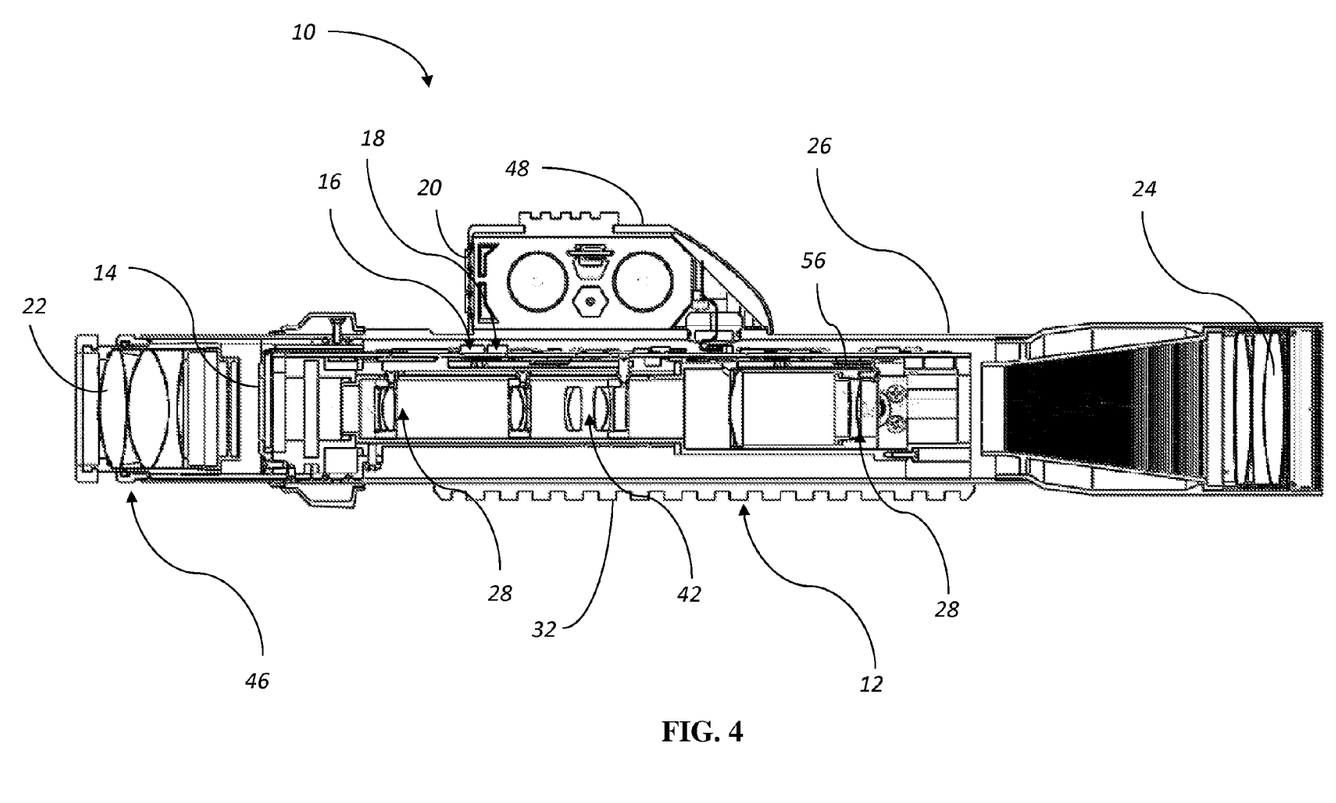
FIG. 4 is a cross-sectional view of the system of FIG. 1 showing various components in accordance with an embodiment of the present disclosure.
Figure 5:
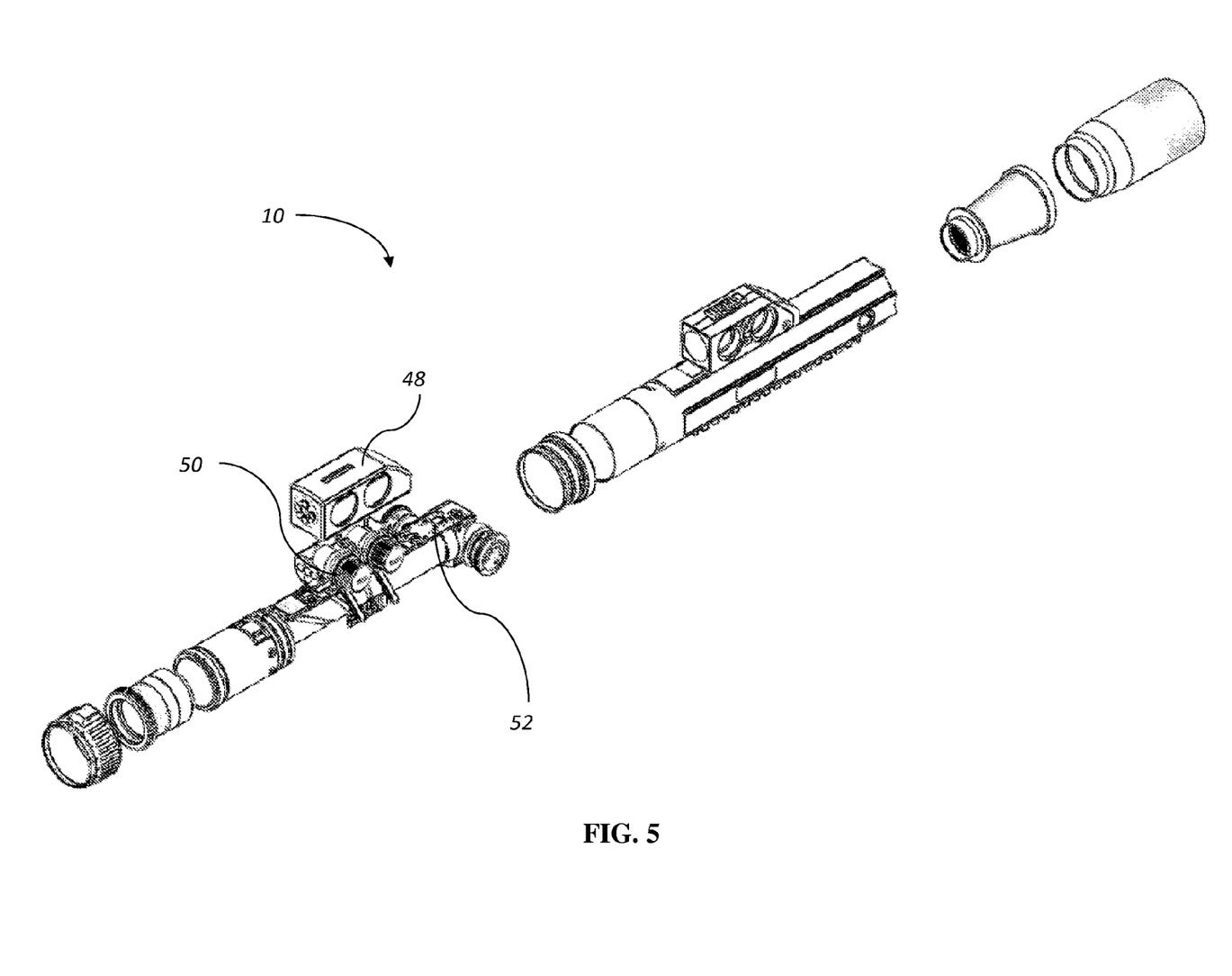
FIG. 5 is an exploded perspective view of the system of FIG. 1 showing various components of the system in accordance with an embodiment of the present disclosure.

With particular reference to FIGS. 4-5, in the illustrated embodiment the processor 16 is disposed above the housing 26 of the telescopic sight assembly 12 on a circuit board 52 which further comprises the memory 18. The system 10 preferably utilizes non-volatile storage (non-volatile memory) because the system is not intended to be powered on continuously and, therefore, should be able to retain information even when not powered. In some embodiments, the system 10 is configured for communicating with one more other systems, e.g. a user's personal computer or smart phone, to enable a user to upload (download) information to (from) the system 10. Such embodiments are preferable because a user is then able to quickly upload information necessary for the system 10 to calculate ballistic solutions, e.g. the ballistic characteristics of a specific firearm load as provided by a manufacturer. Moreover, such embodiments allow for a user to download information related to the calibration information entered by the user during the calibration process that will be described later in this application.

Figure 6:
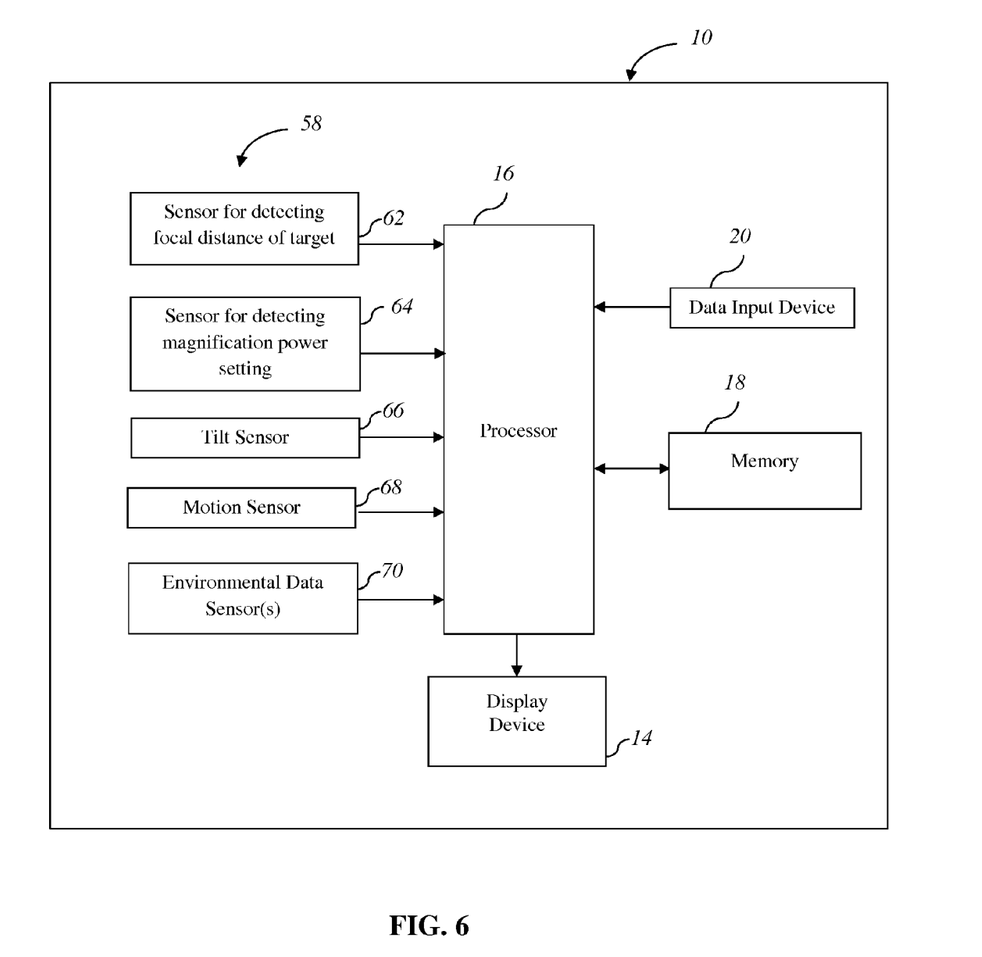
FIG. 6 is a block diagram of the system of FIG. 1 in accordance with an embodiment of the present disclosure.

Referring now to FIG. 6, a block diagram illustrates that the system for calculating ballistic solutions 10 may include a processor 16, a memory 18, one or more sensors 58, a data input device 20, and a display device 14. The processor 16 is configured to communicate and cooperate with each of the memory 18, the data input device 20, the display device 14, and the sensor(s) 58 to cause information to be displayed within the field-of-view (refer to FIGS. 1-5) of the system 10 to assist the user with certain tasks such as, for example, the all-important task of accurately engaging a desired target with a projectile launching device. The following embodiments and descriptions are for illustrative purposes only and are not intended to limit the scope of the systems and methods for calculating ballistic solutions.

In a preferred embodiment, to reduce the overall size and weight of the system 10 the processor 16 is a microprocessor wherein the microprocessor comprises a built in non-volatile memory. The processor 16 may also have one or more communication ports for communicating with other elements of the system 10, with external devices such as a personal computer or a smartphone, or both. In a preferred embodiment, the memory 18 provides information to the processor 16 relating to the particular projectile launching device (not shown) being used, e.g. a user may input data into the system 10 regarding the ballistic characteristics of a specific make of a .308 Winchester ammunition cartridge, as well as the particular environmental conditions such as cross-wind (direction and speed) and the range to the target. Based on this information, the system 10 may then calculate a projectile impact location using standard external ballistic formulas and display that location within the field-of-view 30.

In some embodiments, the memory 18 comprises one or more data storage devices such as semi-conductor memory, magnetic storage, and optical storage. For example, the memory may include a Secure Digital™ (SD) non-volatile memory card. In some embodiments, at least a part of the memory 18 is of an industrial standard format, non-volatile, and also removable, e.g., an SD card or a Universal Serial Bus (USB) flash drive, in order to ensure that the data associated with the system 10 is lasting and easily accessible. Other types of data storage devices known in the art may also be used.

In a preferred embodiment, the data input device 20 includes a plurality of push-buttons as the user interface elements. As used herein, the term data input device is to be defined broadly as any device that can be used to insert data into a computer or other computational device, such as e.g. the system 10. The use of mechanical push-buttons is preferable to other data input devices because, as the system 10 will often be used in conjunction with a rifle in the outdoors, the user may often be wearing gloves. Mechanical push-buttons, thus, will work well while some other devices such as touch screens may require contact with the user's skin or may require special gloves for using touch screens. In some embodiments, the data input device 20 includes a microphone for accepting audible data input from the user or the environment. Preferably, the data input device 20 comprises, in addition to a plurality of push-buttons, one or more additional communications ports. For example, the data input device 20 may include an industrial standard Universal Serial Bus (certified USB™) port, such as a Micro B USB plug, to connect the system 10 to a peripheral device such as a personal computer.

In some embodiments, the data input device 20 includes an image sensor for accepting visual data input from the user or the environment. In some embodiments, an image sensor is directed down range to capture one or more images, including capturing digital video. Preferably, the image sensor is either a charge-coupled device (CCD) or an active-pixel sensor (APS) such as, for example, a complementary metal-oxide-semiconductor (CMOS) sensor. While it is within the scope of the present disclosure for the image sensor to capture images and instantaneously cause the images, through communication with the processor 16, to be displayed by the display device 14 within the field-of-view, in a preferred embodiment the true image, i.e. the actual rays of light reflected from the image as opposed to a digital representation, are viewable to the user. In these embodiments, the camera may be used to capture images or video (along with sound if a microphone is included within the system 10) at predetermined times while the system 10 is in use. This feature will be especially useful for the many hunters who attempt to video record the final moments of a hunt to share with interested parties. Briefly referring back to FIGS. 1-5, in the illustrated embodiment the battery housing 48 further comprises an accessory mounting rail 60 upon which various accessories (including but not limited to the image sensor, the microphone, or both) may be mounted.

In a preferred embodiment, the display device 14 is transparent, e.g. a transparent liquid crystal display (LCD), and is also preferably positioned within the field-of-view 30 of the telescopic sight assembly 12 such that from the view of a system user at least some displayed information is superimposed over the image passing though the optics train 28. As disclosed above, other display devices may be used. The display may be in communication with the processor 16 via an output port of the processor 16. While it is preferable that at least one display device be oriented within the field-of-view 30 of the telescopic sight assembly 12, such a configuration is not required. Accordingly, it should be appreciated that the system 10 may include a single display which is not within the FOV, a single display within the FOV, or multiple displays.

Still referring to FIG. 6, the system 10 may also include one or more sensors 58. As described in more detail above, the system 10 may include a sensor 62 for detecting a focal distance of the target and, preferably, this sensor is a linear position sensor configured to detect the linear position of one or more lenses with relation to one or more other lenses within the optics train 28. The system may also include a sensor 64 for detecting the current magnification power setting of the system 10. In some embodiments, this sensor 64 is also a linear position sensor configured in a similar fashion to the sensor 62 but on the lenses within the system used for magnification of course. The NSE-5310 miniature position sensor described above is suitable for sensor 64 as well.

In some embodiments, the system 10 include a tilt sensor 66 configured to provide the processor 16 with information relating to the position of the system 10, and more particularly to the projectile launching device upon which the system 10 is mounted. For example, the angle of the projectile launching device barrel with relation to the horizon will greatly affect the projectile impact location and, therefore, this angle should be taken into account when calculating a projectile impact location. Moreover, the system 10 may include a motion sensor 68 configured to provide the processor 16 with information regarding any motion, e.g. yaw, of the system 10 thereby enabling the processor 16 to account for the motion when calculating a projectile impact location. One skilled in the art will recognize that in order to engage a moving target, a shooter must "lead" the target by an appropriate amount. Therefore, as the user tracks the target the motion of the system 10 may be accounted for in the calculated projectile impact location. The motion sensor 68 may include a yaw rate gyroscope, a digital compass, or both.

In some embodiments, the system 10 may also include one or more environmental data sensors 70 to collect and communicate to the processor 16 data associated with pertinent environmental conditions. The one or more environmental date sensors at block 70 may include one or more of a wind sensor, a pressure sensor, a temperature sensor, a global positioning system (GPS) sensor, a compass, a humidity sensor, or any combination thereof. Any sensor included in the system 10 may communicate information to the processor 16 to be used in calculating one or more projectile impact locations. In some embodiments, the processor 16 is configured to receive GPS data and cause associated information, e.g. a map, to be displayed on the display device 14.

Referring now to FIGS. 7-18, various depictions of information being displayed within the field-of-view 30 of the system 10 disclosed herein, in accordance with various embodiments of the system 10, are illustrated to provide a more complete understanding of the presently disclosed system 10, and more specifically its operability. It is worth noting that the black space around the field-of-view is present simply to assist the reader of this document in visualizing the system and will not be present in most embodiments of the system 10. It is an intended purpose of system disclosed herein to provide a user friendly and intuitive user interface with regards to inputting information, calibrating the system 10, and also downloading information from the system 10. Because each of FIGS. 7-18 are relatively simple and uncluttered, specific element callouts are not included in all of the figures.

Figure 7:
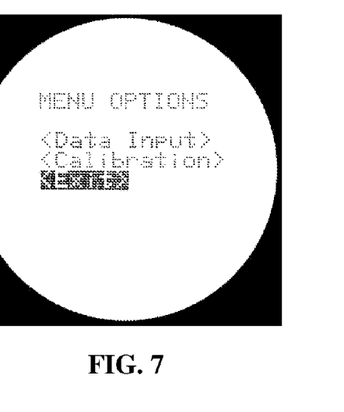
FIGS. 7-18 show various depictions of information being displayed within the field-of-view of the system disclosed herein, in accordance with various embodiments of the system.
Figure 8:
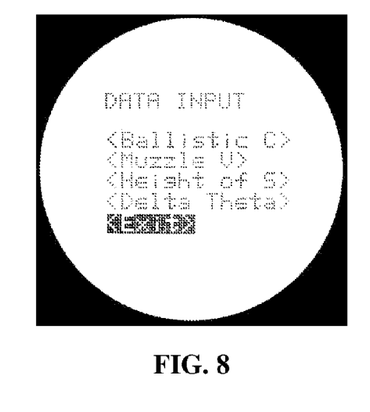
Figure 9:
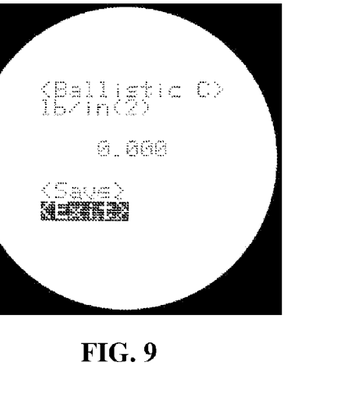
Figure 10:
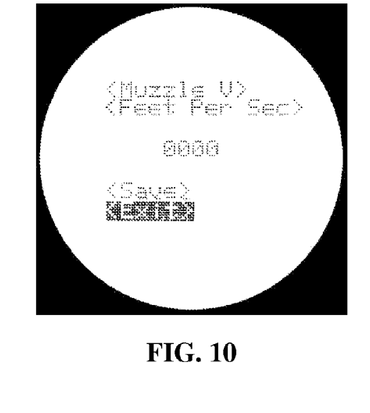
Figure 11:
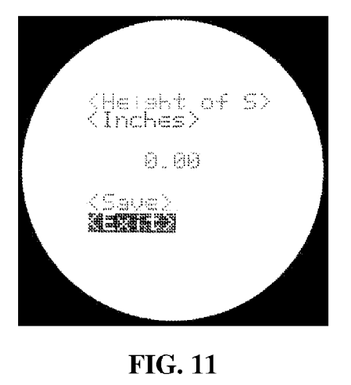
Figure 12:
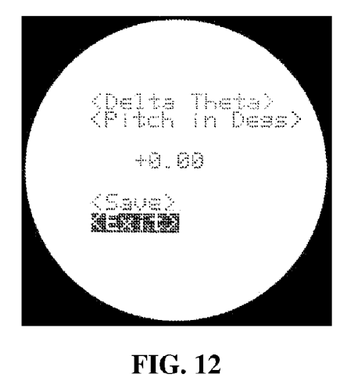
Figure 13:
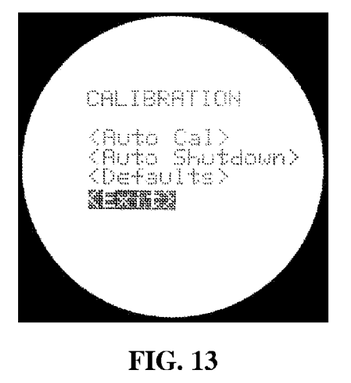
Figure 14:
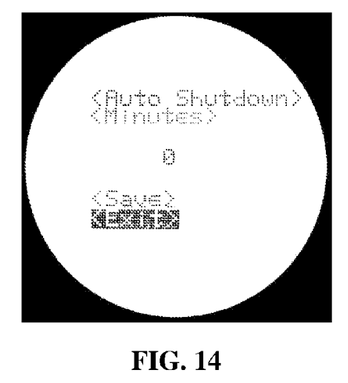

Referring now to FIG. 7, a main menu screen is illustrated which provides the user with three options of which the user selects functions from utilizing the data input device 20. In the preferred embodiment, for reasons that will become apparent herein, the data input device 20 comprises the five pushbuttons arranged in a pattern of four directional arrows around a single center push-button in the illustrated embodiment. In some embodiments, the user enters the main menu (shown in FIG. 7) by pressing the center button while the system 10 is powered on. Utilizing the up arrow and the down arrow of the data input device 20 the user may scroll through the options of: "Data Input"; "Calibration"; and "Exit." Any selection is made simply by scrolling through the options until the desired option is designated, as the "Exit" option is in each of FIGS. 7-14, and then pressing the center push-button to enter that menu option. For example, a user may enter the "Data Input" screen (Shown in FIG. 8) and, from within this screen enter the "Ballistic C" screen (shown in FIG. 9) wherein a user may input into the system 10 the ballistic coefficient of specific ammunition, or a user may enter the "Muzzle V" screen (shown in FIG. 10) wherein a user may input into the system 10 the muzzle velocity of specific ammunition, and so on. With specific reference to FIG. 11 and FIG. 12, in some embodiments a user may also enter data associated with the height of the telescopic sight assembly 12 over the axis defined by the projectile launching device barrel (not shown). As with all examples provided herein, these embodiments and descriptions are for illustrative purposes only and are not intended to limit the scope of the present disclosure. One skilled in the art will recognize that many other types of data may be entered into the system 10.

Figure 15:
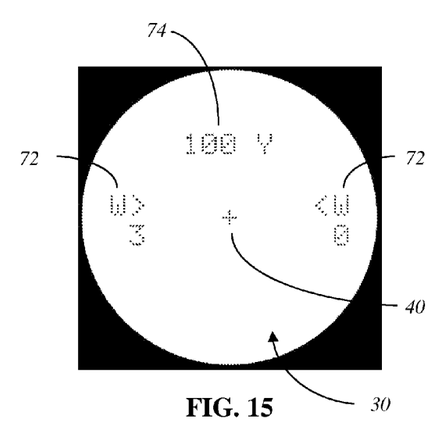

Referring now to FIG. 7 and FIGS. 13-18, shooting and calibration mode screens of the system 10 are shown in accordance with various embodiments of the system disclosed herein. At this point, it is worth referring specifically to FIGS. 15 and 18 as these two illustrations show the display device 14 as it may appear in a shooting mode, e.g. a mode from which the system 10 is displaying a calculated projectile impact location, represented by the reticle 40, to assist the user in accurately engaging a desired target. Note that the reticle 40 location changes between FIG. 15 and FIG. 18; this is due to the system 10 having gone through a calibration process that will now be described in detail. In some embodiments, a user begins the calibration process by entering a calibration mode from the main menu (shown in FIG. 7). Once the system 10 has begun the calibration mode a shooting screen may appear such as, for example, the shooting screen of FIG. 15. With specific reference to FIG. 15, the shooting mode may display within the field-of-view 30 a reticle 40, one or more cross-wind indicators 72, and a range indicator 74. It will be appreciated by one skilled in the art that the screen shown in FIG. 15 represents a calculated impact location represented by the reticle 40, that has been calculated by the processor 16 based on: the specific tilt and motion of the system 10; a left-to-right cross-wind of 3 units of measurement, e.g. feet per second (fps); a range to the target of 100 yards; and any other data relevant to the calculation. Also, while the embodiment of FIG. 15 is shown only depicting the information of a reticle 40, cross-wind indicators 72, and a range indicator 74, it should be appreciated that any type of information may be depicted on one or more displays including but not limited to a calculated projectile impact location, geographical coordinates, a tilt or cant of the projectile launching device, text messages, humidity levels, temperature readings, altitude reading, or any other information. Based on of this screen, a user may then fire a projectile, e.g. a bullet, downrange into a target.

Figure 16:
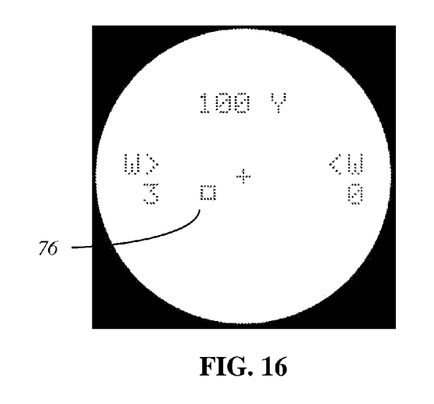
Figure 17:
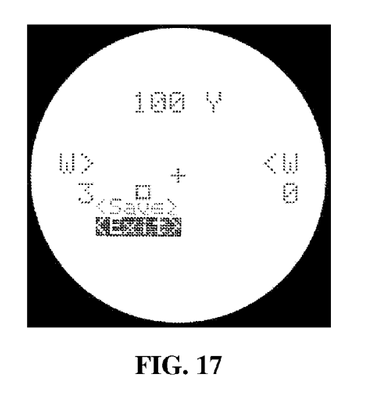
Figure 18:
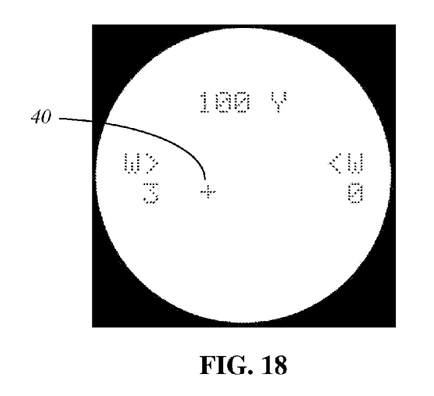

Referring now to FIG. 16, a calibration indicator 76 is illustrated in addition to the other information also present in FIG. 15. Suppose for example that after the user fired one or more projectiles downrange the actual projectile impact location does not coincide with the calculated projectile impact location. Rather than having to manually collect information related to the distance high or low and the distance left or right from the calculated impact location and then subsequently manually enter the collected data into the system 10, all a user need do to calibrate the system 10 based on the now known actual projectile impact location, also referred to as Data Observed from Previous Engagements, is adjust the position of the calibration indicator 76 until the calibration indicator 76 is aligned with, i.e. superimposed over, the actual projectile impact location in the target while the reticle 40 is aligned with the previously aimed at location on the target. Once the calibration indicator 76 is aligned correctly, the user may then save the data via the screen illustrated in FIG. 17. Once the data is saved into the memory 18, the system 10 has been calibrated based on the specific conditions of that environment. Referring now to FIG. 18, an illustration of the shooting mode which would appear, along with the new and now accurate calculated projectile impact location depicted by the reticle 40. It should be apparent that because the conditions have not changed and the system 10 has been calibrated the new location of the reticle 40 is precisely where the calibration indicator 76 was saved in FIG. 17.

In should be appreciated that once a user saves the location of the calibration indicator 76 at an appropriate location within the field-of-view 30, the system 10 may readily translate this input into the error of the initial, i.e. prior to calibration, calculated projectile impact location using simple trigonometry. It should also be appreciated that entering more calibration data based on various environmental conditions will enable the system 10 to calculate more accurate calculated projectile impact locations. As used herein accuracy refers to the degree of closeness of the calculated projectile impact locations to the actual projectile impact locations. In some embodiments, the system 10 recalculates a ballistic coefficient based on the data entered during the calibration process and utilizes different ballistic coefficients for different target ranges thereby simplifying the required calculation as opposed to mapping the effective ballistic coefficient vs.

the Mach number of the projectile at various points of the trajectory. For example, based on entered calibration data the system may use a first ballistic coefficient to calculate projectile impact locations for a target range of 400 yards and a second ballistic coefficient to calculate projectile impact locations for a target range of 600 yards.

While preferred and alternate embodiments have been illustrated and described, as noted above, many changes can be made without departing from the spirit and scope of the systems and methods for calculating ballistic solutions. Accordingly, the scope of the systems and methods for calculating ballistic solutions is not limited by the disclosure of these preferred and alternate embodiments. Instead, the scope of the systems and methods for calculating ballistic solutions should be determined entirely by reference to the claims. It is intended that broader claims will be submitted in an application that claims the benefit of priority from this application.

Insofar as the description above and the accompanying drawing disclose any additional subject matter that is not within the scope of the claim(s) below, the inventions are not dedicated to the public and the right to file one or more applications to claim such additional inventions is reserved.

That is claimed is:

1. A system to calculate ballistic solutions for use with a projectile launching device, the system comprising:
   a telescopic sight assembly for viewing a target, wherein the telescopic sight assembly comprises at least one display device for displaying information;
   a processor in communication with at least one sensor configured to measure at least one optical property of the telescopic sight assembly;
   a memory; and
   a data input device,
      wherein the system for use with a projectile launching device to calculate ballistic solutions is configured to perform passive target ranging, and
      wherein the processor is configured to calculate a known distance from the system to the target based on at least one measured optical property of the telescopic sight assembly.

2. The system of claim 1, wherein the processor is configured to calculate a ballistic trajectory based on at least some data associated with current environmental conditions; and
   the processor is further configured to cause at least one display device to superimpose at least some information within the field-of-view of the telescopic sight assembly;
      wherein the superimposed information comprises at least one calculated projectile impact location being at least partially based on the calculated ballistic trajectory and a known distance from the system to the target.

3. The system of claim 2, wherein the system is configured to receive data associated with one or more actual projectile impact locations and wherein the data associated with one or more actual projectile impact locations is utilized for calibration of the calculated projectile impact location.

4. The system of claim 3, wherein the data associated with one or more actual projectile impact locations is received by a user performing the operations comprising:
   (a) aligning the projectile launching device with a first location of a target;
   (b) launching a projectile;
   (c) realigning the projectile launching device with the first location of the target; and
   (d) inputting data associated with an actual projectile impact location.

5. The system of claim 1, wherein the at least one sensor comprises: a linear position sensor; a range sensor; a wind sensor; an inclinometer; an accelerometer; a gyroscope; a barometric pressure sensor; a temperature sensor; a humidity sensor; a geographical positioning sensor; an altimeter; a compass; or any combination thereof.

6. The system of claim 1, wherein at least one display device for presenting information is one of a liquid-crystal display (LCD), a transparent LCD, a light-emitting diode (LED) display, an organic light-emitting diode (OLED) display, or electrophoretic ink (E ink).

7. A system for calibrating a ballistic solutions device, the system comprising:
   a telescopic sight assembly for viewing a target,
   at least one display device for displaying information to a user within a field-of-view of the telescopic sight assembly;
   a processor configured to receive user input data associated with one or more actual projectile impact locations as observed by the user, the processor being in communication with at least one sensor configured to measure at least one optical property of the telescopic sight assembly;
   a memory; and
   a data input device;
      wherein the processor is further configured to calculate a known distance from the system to the target based on at least one optical property of the telescopic sight assembly; and
      wherein at least one display device is configured to display a calculated projectile impact location.

8. The system of claim 7, configured to receive the data associated with one or more actual projectile impact locations by a user performing the operations comprising:
   (a) aligning the projectile launching device with the target such that the calculated projectile impact location is aligned with a first location of the target;
   (b) launching a projectile;
   (c) realigning the projectile launching device with the target such that the calculated projectile impact location is aligned with the first location of the target; and
   (d) inputting data associated with one or more actual projectile impact locations.

9. The system of claim 8, further configured to display within the field-of-view of the telescopic sight assembly a calibration indicator;
   wherein the data associated with the one or more actual projectile impact locations is received by a user performing the operation of inputting data to align the calibration indicator with one or more actual projectile impact locations while the projectile launching device remains aligned with the target such that the calculated projectile impact location is aligned with the first location of the target.

10. The system of claim 7, further comprising: a linear position sensor; a range sensor; a wind sensor; an inclinometer; an accelerometer; a gyroscope; a barometric pressure sensor; a temperature sensor; a humidity sensor; a geographical positioning sensor; an altimeter; a compass; or any combination thereof.

11. The system of claim 7, wherein at least one display device for presenting information is one of a liquid-crystal display (LCD), a transparent LCD, a light-emitting diode (LED) display, an organic light-emitting diode (OLED) display, or electrophoretic ink (E ink).

12. A method comprising the steps of:
   (a) calculating by a processor a projectile impact location;
   (b) displaying the calculated projectile impact location within the field-of-view of a telescopic sight assembly;
   (c) aligning the projectile launching device with a first target such that the calculated projectile impact location is aligned with a first location of the first target;

(d) launching a projectile;
(e) realigning the projectile launching device with the first target such that the calculated projectile impact location is aligned with the first location of the first target;
(f) receiving user input data associated with one or more actual projectile impact locations, wherein the user input data includes a movement of a calibration indicator within the field-of-view of the telescopic sight assembly until the calibration indicator is superimposed over one or more actual projectile impact locations while the projectile launching device remains aligned with the first target such that the calculated projectile impact location is aligned with the first location of the first target; and
(g) calibrating the calculated projectile impact location based on the data associated with one or more actual projectile impact locations.

13. The method of claim 12, further comprising:
iteratively repeating one or more steps of the method until the calculated projectile impact location and the actual projectile impact location are calibrated to be within a predetermined level of accuracy.

14. The method of claim 12, further comprising the step of:
calculating a distance to the first target based on at least one measured relative position between the first component of the telescopic sight assembly and the second component of the telescopic sight assembly.

* * * * *